US010557353B2

(12) United States Patent
Malmborg et al.

(10) Patent No.: US 10,557,353 B2
(45) Date of Patent: Feb. 11, 2020

(54) HOLLOW FAN BLADE CONSTRAINED LAYER DAMPER

(71) Applicant: United Technologies Corporation, Farmington, CT (US)

(72) Inventors: Eric W. Malmborg, Amston, CT (US); Thomas A. Pollack, St. Augustine, FL (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 185 days.

(21) Appl. No.: 15/786,915

(22) Filed: Oct. 18, 2017

(65) Prior Publication Data

US 2019/0112931 A1    Apr. 18, 2019

(51) Int. Cl.
*F01D 5/16* (2006.01)
*F01D 5/18* (2006.01)

(52) U.S. Cl.
CPC ............... *F01D 5/16* (2013.01); *F01D 5/18* (2013.01); *F05D 2220/36* (2013.01); *F05D 2260/96* (2013.01)

(58) Field of Classification Search
CPC .... F04D 29/023; F04D 29/324; F04D 29/668; F01D 5/28; F01D 5/147; F01D 5/16; F01D 5/18; F05D 2220/36; F05D 2250/11; F05D 2300/612; F05D 2260/96
See application file for complete search history.

(56) References Cited

U.S. PATENT DOCUMENTS

| 5,634,771 | A |   | 6/1997 | Howard et al. |
| 5,947,688 | A |   | 9/1999 | Schilling et al. |
| 6,033,186 | A |   | 3/2000 | Schilling et al. |
| 6,039,542 | A | * | 3/2000 | Schilling ............... F01D 5/16 416/224 |
| 6,544,002 | B1 |   | 4/2003 | Evans et al. |
| 7,025,568 | B2 | * | 4/2006 | Jones ..................... F01D 5/16 29/889.72 |
| 8,182,233 | B2 | * | 5/2012 | Goldfinch ............ B21D 53/78 416/229 R |

(Continued)

FOREIGN PATENT DOCUMENTS

| EP | 0926312 A2 | 6/1999 |
| EP | 2014386 A1 | 1/2009 |
| GB | 2468199 A | 9/2010 |

OTHER PUBLICATIONS

The Extended European Search Report for Application No. 18201285.6-1006; Report dated Mar. 15, 2019; 10 pages.

*Primary Examiner* — Justin D Seabe
*Assistant Examiner* — Joshua R Beebe
(74) *Attorney, Agent, or Firm* — Cantor Colburn LLP (57) ABSTRACT

A fan blade having a damping system is provided. The fan blade comprising: a fan blade body having one or more compartments within the fan blade body; a damping material located within at least one of the one or more compartments; one or more partial ribs originating at the fan blade body and extending into at least one of the one or more compartments, wherein each of the one or more partial ribs terminate at a distal end; and one or more damping plates, wherein each of the one or more damping plates are attached to a distal end of a partial rib, wherein the damping material is located between the damping plate and the fan blade body.

20 Claims, 4 Drawing Sheets

(56) References Cited

U.S. PATENT DOCUMENTS

| | | | |
|---|---|---|---|
| 8,529,720 B2 * | 9/2013 | Goldfinch | B21D 26/055 |
| | | | 156/182 |
| 8,763,360 B2 | 7/2014 | Murdock | |
| 8,821,124 B2 | 9/2014 | Viens et al. | |
| 8,857,054 B2 | 10/2014 | Goldfinch et al. | |
| 9,028,219 B2 * | 5/2015 | Clark | F01D 5/147 |
| | | | 416/229 A |
| 2005/0249601 A1 * | 11/2005 | Burdgick | F01D 5/147 |
| | | | 416/229 A |
| 2009/0022599 A1 * | 1/2009 | Burdgick | F01D 5/147 |
| | | | 416/230 |
| 2013/0108470 A1 * | 5/2013 | Weisse | F01D 5/147 |
| | | | 416/97 R |
| 2014/0050589 A1 | 2/2014 | Viens et al. | |
| 2017/0023008 A1 * | 1/2017 | Roche | F01D 5/282 |

* cited by examiner

HOLLOW FAN BLADE CONSTRAINED LAYER DAMPER

BACKGROUND

The subject matter disclosed herein generally relates to fan blades in gas turbine engines and, more particularly, to a method and apparatus for damping blades of gas turbine engines.

The environment in which fan blades operate can create high dynamic stress. Sources of the high stress include inlet distortion, flutter and post bird ingestion run-on for the diversion mission. Inlet distortion stress can be created by several sources, including inlet geometry, cross wind, inlet separation and inlet vortices. These elevated vibratory stresses can exceed fatigue capability resulting in reduced fan blade life.

SUMMARY

According to one embodiment, a fan blade having a damping system is provided. The fan blade comprising: a fan blade body having one or more compartments within the fan blade body; a damping material located within at least one of the one or more compartments; one or more partial ribs originating at the fan blade body and extending into at least one of the one or more compartments, wherein each of the one or more partial ribs terminate at a distal end; and one or more damping plates, wherein each of the one or more damping plates are attached to a distal end of a partial rib, wherein the damping material is located between the damping plate and the fan blade body.

In addition to one or more of the features described above, or as an alternative, further embodiments may include that the one or more compartments includes a first compartment proximate a root end of the fan blade body and a second compartment proximate the tip end of the fan blade body.

In addition to one or more of the features described above, or as an alternative, further embodiments may include that the damping material and each of the one or more damping plates are located in the first compartment.

In addition to one or more of the features described above, or as an alternative, further embodiments may include that the first compartment includes a first sub-compartment located proximate a leading edge of the blade and a second sub-compartment located proximate the trailing edge of the blade.

In addition to one or more of the features described above, or as an alternative, further embodiments may include that the damping material and each of the one or more damping plates are located in the first sub-compartment.

In addition to one or more of the features described above, or as an alternative, further embodiments may include that each of the one or more partial ribs are spaced intermittently chordwise within the first compartment.

In addition to one or more of the features described above, or as an alternative, further embodiments may include that each of the one or more partial ribs are spaced intermittently spanwise within the first compartment.

In addition to one or more of the features described above, or as an alternative, further embodiments may include that each of the one or more partial ribs are spaced intermittently chordwise within the first sub-compartment.

In addition to one or more of the features described above, or as an alternative, further embodiments may include that each of the one or more partial ribs are spaced intermittently spanwise within the first sub-compartment.

In addition to one or more of the features described above, or as an alternative, further embodiments may include that the fan blade body further includes a base and a cover attached to the base, wherein the cover and the base define at least one of the one or more compartments within the fan blade body.

In addition to one or more of the features described above, or as an alternative, further embodiments may include that the base is located on an airfoil pressure side of the fan blade and the cover is located on an airfoil suction side of the fan blade.

In addition to one or more of the features described above, or as an alternative, further embodiments may include that each of the one or more partial ribs originates at the base of the fan blade body.

In addition to one or more of the features described above, or as an alternative, further embodiments may include that each damping plate is oriented about planar with the cover of the fan blade body.

In addition to one or more of the features described above, or as an alternative, further embodiments may include further comprising a full rib extending from the base to the cover, wherein the full rib is configured to provide structural support between the cover and the base.

According to another embodiment, a method of manufacturing a fan blade having a damping system is provided. The method comprising: machining one or more compartments within a base of a fan blade body; machining one or more partial ribs originating at the base and extending into at least one of the one or more compartments, wherein each of the one or more partial ribs terminate at a distal end; attaching one or more damping plates to the one or more partial ribs, wherein each damping plate is attached to the distal end of one of the one or more partial ribs; attaching a cover to the base, wherein the cover and the base define at least one of the one or more compartments within the fan blade body; and injecting a damping material into a compartment defined by the cover and the base.

In addition to one or more of the features described above, or as an alternative, further embodiments may include: forming a pressure side airfoil contour in the base of the fan blade body, wherein the pressure side airfoil contour is opposite the one or more compartments.

In addition to one or more of the features described above, or as an alternative, further embodiments may include: forming a suction side airfoil contour in the cover of the fan blade body.

According to another embodiment, a gas turbine engine is provided. The gas turbine engine comprising: a compressor section; a turbine section; and one or more fan blades located within at least one of the compressor section and the turbine section, each of the one or more fan blades comprising: a fan blade body having one or more compartments within the fan blade body; a damping material located within at least one of the one or more compartments; one or more partial ribs originating at the fan blade body and extending into at least one of the one or more compartments, wherein each of the one or more partial ribs terminate at a distal end; and one or more damping plates, wherein each of the one or more damping plates are attached to a distal end of a partial rib, wherein the damping material is located between the damping plate and the fan blade body.

In addition to one or more of the features described above, or as an alternative, further embodiments may include that the one or more compartments includes a first compartment proximate a root end of the fan blade body and a second compartment proximate the tip end of the fan blade body.

In addition to one or more of the features described above, or as an alternative, further embodiments may include that the damping material and each of the one or more damping plates are located in the first compartment.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike.

The detailed description explains embodiments of the present disclosure, together with advantages and features, by way of example with reference to the drawings.

DETAILED DESCRIPTION

A detailed description of one or more embodiments of the disclosed apparatus and method are presented herein by way of exemplification and not limitation with reference to the Figures.

The environment in which fan blades operate can create high dynamic stress. Sources of the high stress include inlet distortion, flutter and post bird ingestion run-on for the diversion mission. Inlet distortion stress can be created by several sources, including inlet geometry, cross wind, inlet separation and inlet vortices. These elevated vibratory stresses can exceed fatigue capability resulting in reduced fan blade life.

Embodiments disclosed herein include apparatuses and methods to attenuate high vibratory stress in a hollow airfoil design. A hollow airfoil, which can be a stator or rotor, typically has internal structure to provide stiffness for static and vibratory loading design requirements. Advantageously, a hollow airfoil allows a damping system to be incorporated internal to the airfoil and prevents aerodynamic interference.

Figure 1:
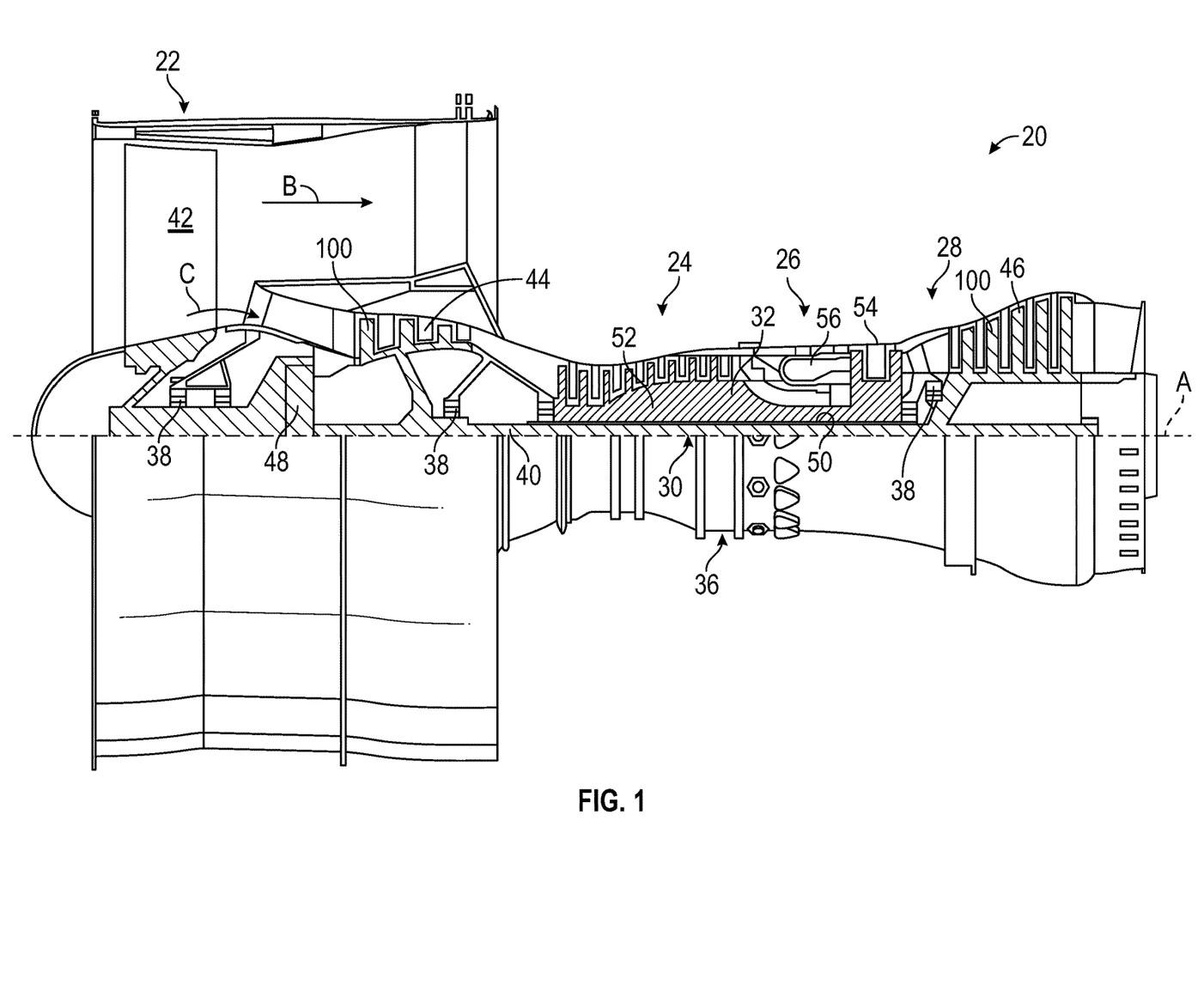
FIG. 1 is a partial cross-sectional illustration of a gas turbine engine, in accordance with an embodiment of the disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. The compressor section 24 and the turbine section 28 each include fan blades 100. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7\ °R)]^{0.5}$. The "Low corrected fan tip speed" as disclosed herein according to one non-limiting embodiment is less than about 1150 ft/second (350.5 m/sec).

Figure 2:
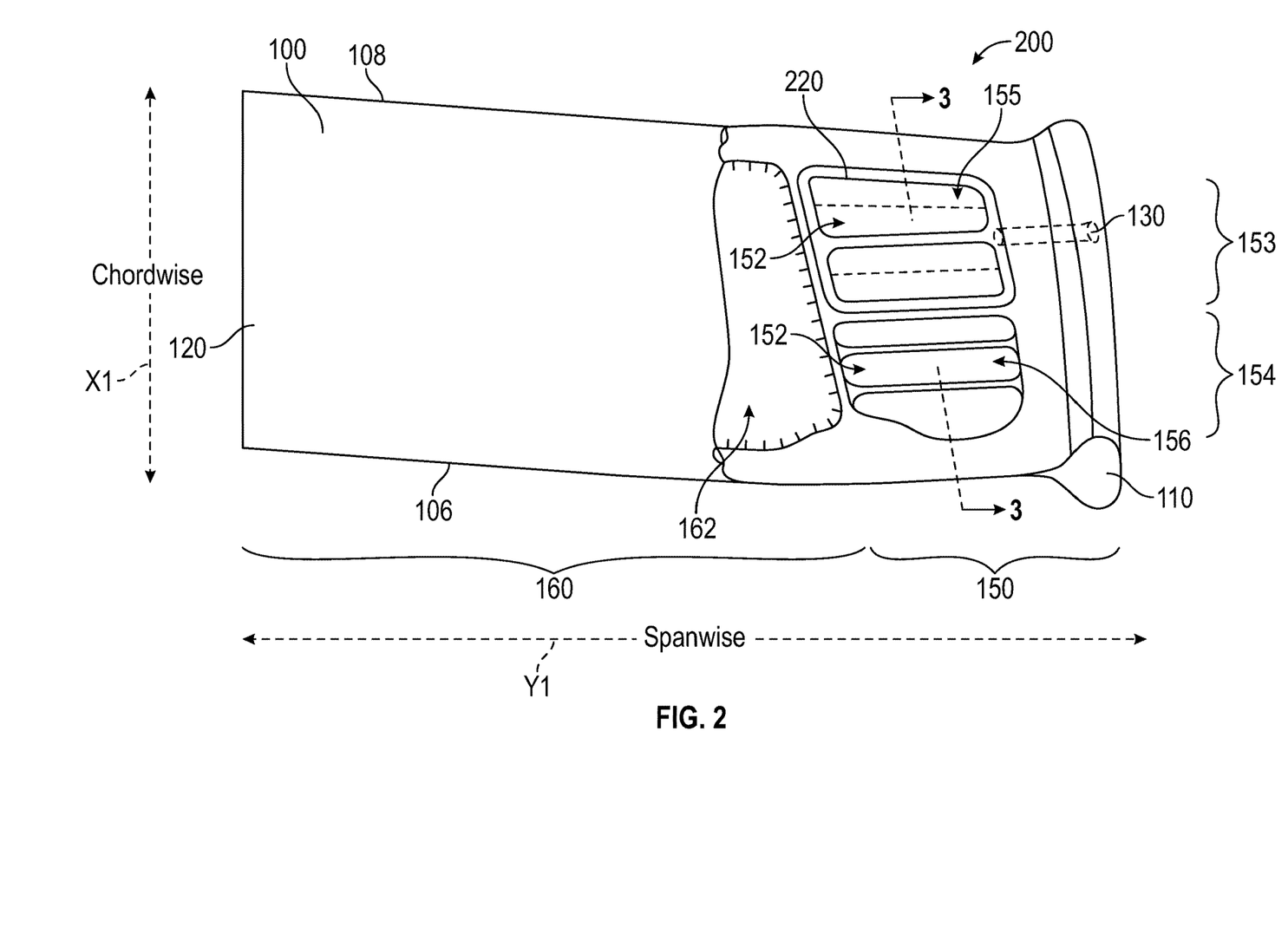
FIG. 2 is a cross-sectional planform view illustration of a damping system for a fan blade, in accordance with an embodiment of the disclosure.
Figure 3:
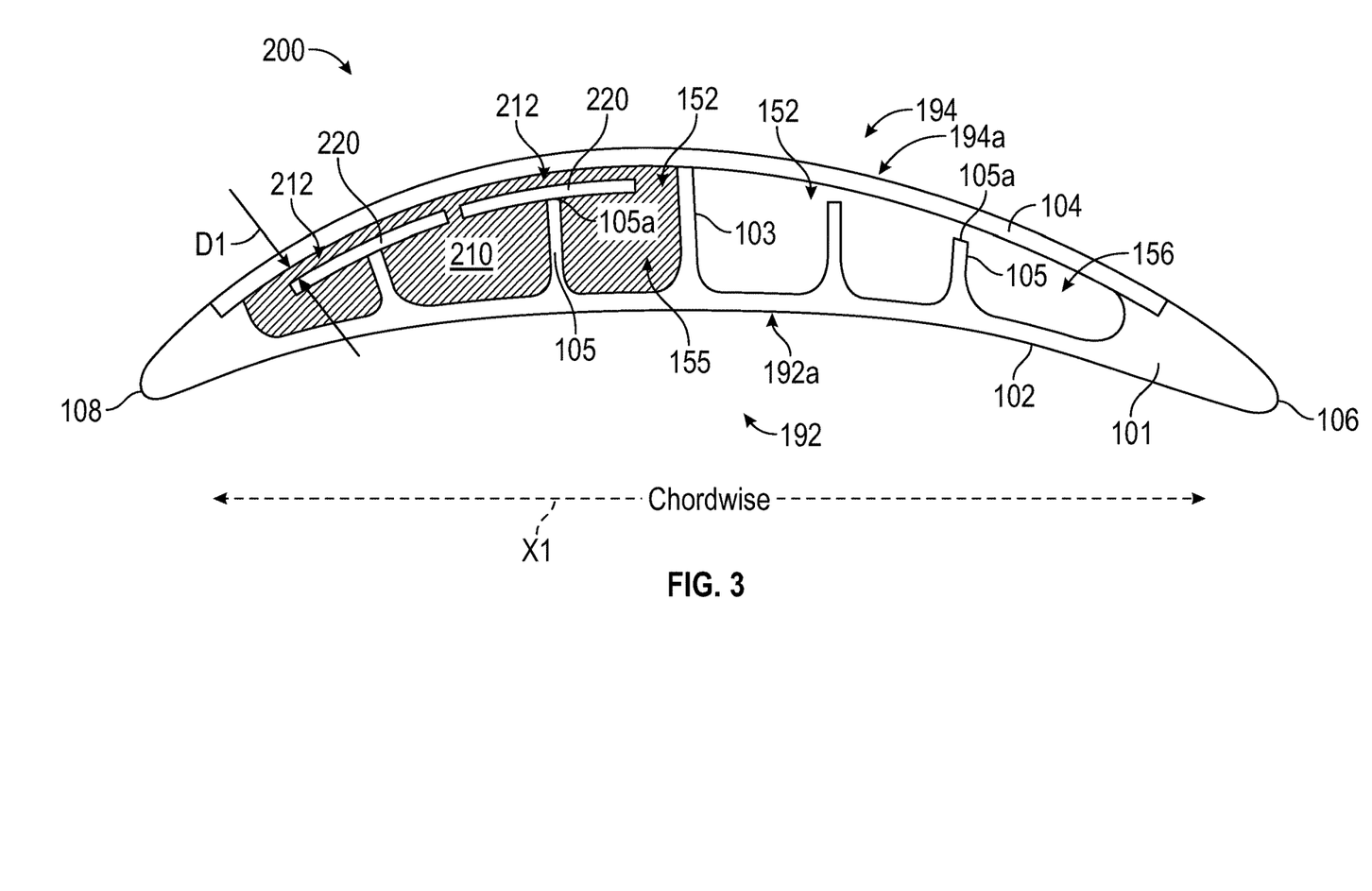
FIG. 3 is a cross-sectional side view illustration of a damping system for a fan blade, in accordance with an embodiment of the disclosure.

FIG. 2-3 are schematic illustrations of fan blade 100 having a damping system 200. As seen in FIG. 2, the fan blade 100 stretches spanwise Y1 from a root 110 to a tip 120 and also stretched chordwise X1 from a leading edge 106 to a trailing edge 108. The fan blade 100 may include multiple spanwise sections 150, 160 spanning spanwise across the fan blade 100. In the exemplary illustration of FIG. 2, the fan blade includes two spanwise sections 150, 160 including a first spanwise section 150 and a second spanwise section 160. The first spanwise section 150 is located proximate to the root 110 of the fan blade 100 and the second spanwise section 160 is located proximate the tip 120 of the fan blade 100, as seen in FIG. 2. Each spanwise section 150, 160 may include one or more compartments 152, 162, enclosed within the fan blade 100. Each compartment 152, 162 may be broken down into sub-compartments 155, 156. In the exemplary illustration of FIG. 2, the first spanwise section 150 includes a first compartment 152 and the second spanwise section 160 includes a second sub-compartment 162. It is understood that while the embodiments disclosed herein are not limited to the damping system 200 being located in the first compartment 152, thus the damping system 200 may be located in the second compartment 162 as well.

The fan blade 100 may include multiple chordwise sections 153, 154 spanning chordwise X1 across the fan blade 100. In the exemplary illustration of FIG. 2, the fan blade 100 includes two chordwise sections 153, 154 including a first chordwise section 153 and a second chordwise section 154. The first chordwise section 153 is located proximate to the trailing edge 108 of the fan blade 100 and the second chordwise section 154 is located proximate the leading edge 106 of the fan blade 100, as seen in FIG. 2. Each chordwise section 153, 154 may include one or more sub-compartments 155, 156 of the first compartment 152 enclosed within the fan blade 100. Each sub-compartment 155, 156 may be broken down into further sub-compartments (not shown). In the exemplary illustration of FIG. 2, the first chordwise section 153 includes a first sub-compartment 155 and the second chordwise section 154 includes second sub-compartment 156. The damping system 200 may be located in the first sub-compartment 155. The fan blade 100 may include a fill port 130 such that an elastomeric damping material 210 (See FIG. 3) may be injected into the first sub-compartment 155. It is understood that the embodiments disclosed herein are not limited to only two sub-compartments 156, 155 in the first compartment 152, thus the first compartment 152 and the second compartment 162 may be sub-divided into any number of sub-compartments and each sub-compartment may or may not contain a damping system 200 depending upon the overall damping requirements of the fan blade 100. The damping system 200 includes one or more damping plate 220 discussed further below. The damping plates 220 are oriented in the spanwise Y1 direction, as seen in FIG. 2. It is understood that the embodiments disclosed herein are not limited to the damping plate 220 being oriented in the spanwise Y1 direction, thus the damping plate 220 may be oriented in any other direction in a plane of the fan blade 100 including but not limited to the chordwise X1 direction. Advantageously, the direction of orientation of the damping plates 220 may be tailored to address specific modes of the fan blade 100.

Referring now to FIG. 3 with continued reference to FIG. 2. FIG. 3 shows a chordwise cross-sectional view of the fan blade 100. The fan blade body 101 encloses the first compartment 152 is visible in FIG. 2. The fan blade body 101 of the fan blade 100 includes a base 102 and a cover 104 attached to the base 102. The base 102 may be located on an airfoil pressure side 192 of the fan blade 100 and includes a pressure side airfoil contour 192a, as seen in FIG. 3. The cover 104 may be located on an airfoil suction side 194 of the fan blade 100 and includes a suction side airfoil contour 194a, as seen in FIG. 3. It is understood that the embodiments disclosed herein are not limited to the cover 104 being located on the airfoil suction side 194 and the base 102 being located on the airfoil pressure side 192, thus the cover 104 may be located on the airfoil pressure side 192 and the base 102 may be located on the airfoil suction side 194. The first compartment 152 may be separated into the first sub-compartment 155 and the second sub-compartment 156 by a full rib 103. The full rib 103 extends from the base 102 of the fan blade 100 to the cover 104 of the fan blade 100. The full rib 103 divides the first compartment 152 approximately in half in a non-limiting embodiment. The full rib 103 is configured to provide structural support between the cover 104 and the base 102. Advantageously, the full rib 103 also serves to separate the sub-compartment that contains the damping system 200 from the sub-compartment that does not contain the damping system 200. In FIG. 3, it may be seen that the full rib 103 separates the first sub-compartment 155 containing the damping system 200 from the second sub-compartment 156. The full rib 103 helps keep the elastomeric damping material 210 in the first sub-compartment 155.

The first sub-compartment 155 may include one or more partial ribs 105 originating at the base 102 and extending into the first sub-compartment 155. The partial ribs 105 each terminate at a distal end 105a located within the first sub-compartment 155 prior to reaching the cover 104, as seen in FIG. 3. The partials ribs 105 may be spaced intermittently within the first sub-compartment 155. In an embodiment, the first sub-compartment 155 may include two partial ribs 105, as seen in FIG. 3. It is understood that the first sub-compartment 155 may include more or less than two partial ribs 105. It is also understood that while FIG. 3 only shows one or more partial ribs 105 intermittently spaced chordwise X1 within the first sub-compartment 155, the first sub-compartment 155 may also include one or more partial ribs 105 intermittently spaced spanwise Y1 within the first sub-compartment 155.

The second sub-compartment 156 may include one or more partial ribs 105 originating at the base 102 and extending into the second sub-compartment 156. The partial ribs 105 each terminate at a distal end 105a located within the second sub-compartment 156 prior to reaching the cover 104, as seen in FIG. 3. The partials ribs 105 may be spaced intermittently within the second sub-compartment 156. In an embodiment, the second sub-compartment 156 may include two partial ribs 105, as seen in FIG. 3. It is understood that the second sub-compartment 156 may include more or less than two partial ribs 105. It is also understood that while FIG. 3 only shows one or more partial ribs 105 intermittently spaced chordwise X1 within the second sub-compartment 156, the second sub-compartment 156 may also include one or more partial ribs 105 intermittently spaced spanwise Y1 within the second sub-compartment 156.

The damping system 200 may be located in at least one of the first sub-compartment 155 and the second sub-compartment 156. In an embodiment, the damping system 200 may be located in the first sub-compartment 155 proximate the trailing edge 108. It is understood that the embodiments disclosed herein are not limited to locating the damping system 200 proximate the trailing edge 108, thus the damping system may be located proximate at least one of the leading edge 106, the trailing edge 108, the root 110, and the tip 120 depending upon the overall damping requirements of the fan blade 100.

The damping system 200 may include one or more damping plates 220. Each of the one or more damping plates 220 are attached to the distal end 105*a* of the partial rib 105. Each damping plate 220 oriented about planar with the cover 104 of the fan blade body 101, as seen in FIG. 3. Each damping plate 220 is located such that a gap 212 exists between the damping plate 220 and the cover 104 of the fan blade body 101. Since the damping plate 220 is oriented about planar with the cover 104, the gap 212 is uniform in the spanwise Y1 and chordwise X1 directions of the fan blade 100. The thickness D1 of the gap 220 may be large enough such that elastomeric damping material 210 may be located between the damping plate 220 and the cover 104 of the fan blade body 101. Advantageously, the thickness of the gap 212 may be adjusted to maximize damping system 200 performance while enabling long term durability of the damping material 210. Further the damping material 210 may be selected such that modes/frequencies of interest for each specific fan blade 100 are damped by the damping material 210.

Figure 4:
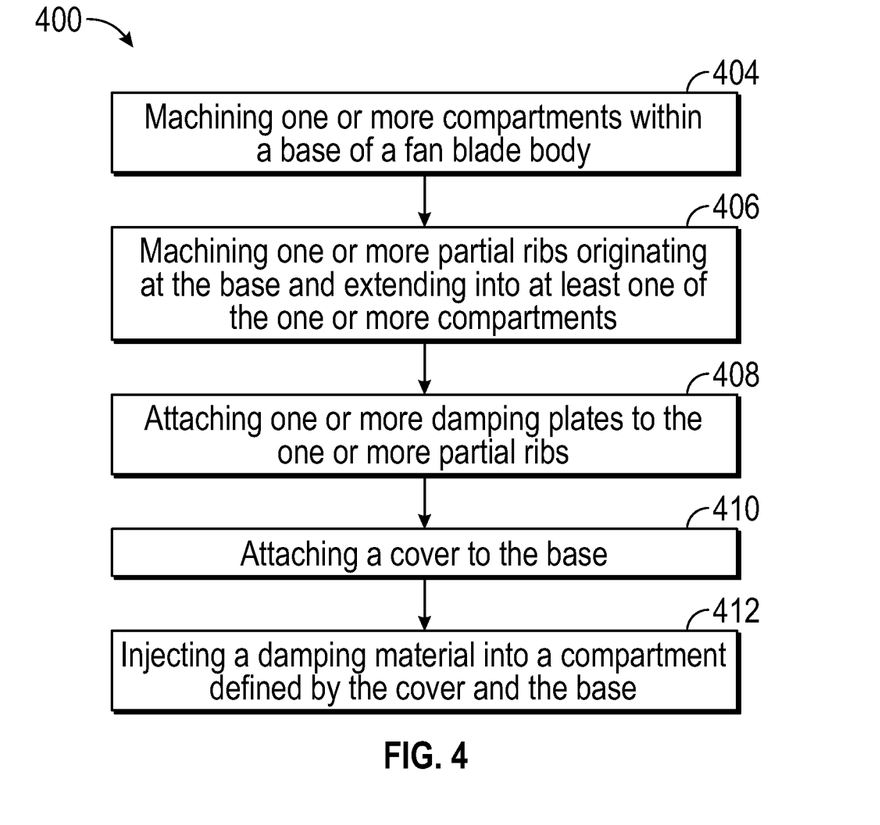
FIG. 4 is a flow chart illustrating a method manufacturing a fan blade having a damping system, in accordance with an embodiment of the disclosure.

Referring now to FIG. 4 with continued reference to FIGS. 1-3. FIG. 4 is a flow chart illustrating method 400 of manufacturing a fan blade 100 having a damping system 200, according to an embodiment of the present disclosure. At block 404, one or more compartments 152, 162 are machined within a base 102 of a fan blade body 101. The one or more compartments 152, 162 may include one or more sub-compartments 155, 156, as described above. Further, a pressure side airfoil contour 192*a* may be formed in the base 102 of the fan blade body 101. The pressure side airfoil contour 192*a* is opposite the one or more compartments 152, 162.

At block 406, one or more partial ribs 105 are machined. The one or more partial ribs 105 originate at the base 102 and extend into at least one of the one or more compartments 152, 162. Each of the one or more partial ribs terminate at a distal end 105*a*. At block 408, one or more damping plates 220 are attached to the one or more partial ribs 105. Each damping plate 220 is attached to the distal end 105*a* of one of the one or more partial ribs 105 as seen in FIG. 3.

At block 410, a cover 104 is attached to the base 102. The cover 104 may be joined to base 102 to form the body 101 through various methods, including but not limited to diffusion bonding, welding, brazing, or similar method known to one of skill in the art. The cover 104 and the base 102 define at least one of the one or more compartments 152, 162 within the fan blade body 101. The method 400 may further include forming a suction side airfoil contour 194*a* in the cover 104 of the fan blade body 101.

While the above description has described the flow process of FIG. 4 in a particular order, it should be appreciated that unless otherwise specifically required in the attached claims that the ordering of the steps may be varied.

Technical effects of embodiments of the present disclosure include reducing vibration in a fan blade utilizing a damping system internal to the fan blade.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A fan blade having a damping system, the fan blade comprising:
    a fan blade body having a first compartment proximate a root end of the fan blade body, a second compartment proximate a tip end of the fan blade body, a base, and a cover attached to the base;
    a full rib extending from the base to the cover, wherein the full rib separates the first compartment into a first sub-compartment located proximate a leading edge of the blade and a second sub-compartment located proximate a trailing edge of the blade;
    a damping material located only within the first sub-compartment, the full rib keeps the damping material in the first sub-compartment;
    one or more partial ribs originating at the fan blade body and extending into at least one of the first sub-compartment and the second sub-compartment, wherein each of the one or more partial ribs terminate at a distal end; and
    one or more damping plates, wherein each of the one or more damping plates are attached to a distal end of a partial rib, wherein the damping material is located between each of the one or more damping plates located in the first sub-compartment and the fan blade body.

2. The fan blade of claim 1, wherein each of the one or more damping plates are located in the first sub-compartment.

3. The fan blade of claim 1, wherein each of the one or more partial ribs are spaced intermittently chordwise within the first compartment.

4. The fan blade of claim 1, wherein each of the one or more partial ribs are spaced intermittently spanwise within the first compartment.

5. The fan blade of claim 1, wherein each of the one or more partial ribs are spaced intermittently chordwise within the first sub-compartment.

6. The fan blade of claim 1, wherein each of the one or more partial ribs are spaced intermittently spanwise within the first sub-compartment.

7. The fan blade of claim 1, wherein the cover and the base define the first compartments within the fan blade body.

8. The fan blade of claim 1, wherein the base is located on an airfoil pressure side of the fan blade and the cover is located on an airfoil suction side of the fan blade.

9. The fan blade of claim 1, wherein each of the one or more partial ribs originates at the base of the fan blade body.

10. The fan blade of claim 1, wherein each damping plate is oriented planar with the cover of the fan blade body.

11. The fan blade of claim 1, wherein the full rib is configured to provide structural support between the cover and the base.

12. A method of manufacturing a fan blade having a damping system, the method comprising:
    machining a first compartment proximate a root end of the fan blade body, a second compartment proximate a tip end of the fan blade body within a base of a fan blade body;
    machining a full rib within the base of the fan blade body, the full rib separates the first compartment into a first sub-compartment located proximate a leading edge of the blade and a second sub-compartment located proximate a trailing edge of the blade;
    machining one or more partial ribs originating at the base and extending into at least one of the one or more compartments, wherein each of the one or more partial ribs terminate at a distal end;
    attaching one or more damping plates to the one or more partial ribs, wherein each damping plate is attached to the distal end of one of the one or more partial ribs;
    attaching a cover to the base, the cover and the base defining at least one of the first compartments within the fan blade body, wherein the full rib extends from the base to the cover; and
    injecting a damping material into only the first sub-compartment, the full rib keeps the damping material in the first sub-compartment.

13. The method of claim 12, further comprising: forming a pressure side airfoil contour in the base of the fan blade body, wherein the pressure side airfoil contour is opposite the one or more compartments.

14. The method of claim 12, further comprising: forming a suction side airfoil contour in the cover of the fan blade body.

15. A gas turbine engine comprising:
    a compressor section;
    a turbine section; and
    one or more fan blades located within at least one of the compressor section and the turbine section, at least one of the one or more fan blades comprising:
    a fan blade body having a first compartment proximate a root end of the fan blade body, a second compartment proximate a tip end of the fan blade body, a base, and a cover attached to the base;
    a full rib extending from the base to the cover, wherein the full rib separates the first compartment into a first sub-compartment located proximate a leading edge of the blade and a second sub-compartment located proximate a trailing edge of the blade;
    a damping material located only within the first sub-compartment, the full rib keeps the damping material in the first sub-compartment;
    one or more partial ribs originating at the fan blade body and extending into at least one of the first sub-compartment and the second sub-compartment wherein each of the one or more partial ribs terminate at a distal end; and
    one or more damping plates, wherein each of the one or more damping plates are attached to a distal end of a partial rib, wherein the damping material is located between each of the one or more damping plates located in the first sub-compartment and the fan blade body.

16. The gas turbine of claim 15, wherein each of the one or more damping plates are located in the first sub-compartment.

17. The gas turbine of claim 15, wherein each of the one or more partial ribs are spaced intermittently chordwise within the first sub-compartment.

18. The gas turbine of claim 15, wherein each of the one or more partial ribs are spaced intermittently spanwise within the first sub-compartment.

19. The gas turbine of claim 15, wherein the base is located on an airfoil pressure side of the fan blade and the cover is located on an airfoil suction side of the fan blade.

20. The gas turbine of claim 15, wherein each of the one or more partial ribs originates at the base of the fan blade body.

* * * * *